(12) United States Patent
Breese et al.

(10) Patent No.: US 6,981,302 B1
(45) Date of Patent: Jan. 3, 2006

(54) USE OF DRIVESHAFT WALL THICKNESS VARIATION TO BALANCE A DRIVESHAFT ASSEMBLY

(75) Inventors: Douglas E. Breese, Walbridge, OH (US); Jeffrey D. Periat, Toledo, OH (US); James A. Duggan, Temperance, MI (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 10/643,530

(22) Filed: Aug. 19, 2003

(51) Int. Cl.
*F16C 3/20* (2006.01)

(52) U.S. Cl. .............................. 29/407.07; 29/407.05; 29/406; 73/468; 464/127; 464/180

(58) Field of Classification Search ............. 29/407.05, 29/407.07, 407.08, 406, 33 T, 33 D; 72/370.14, 72/370.15, 370.23, 370.24; 73/65.01, 65.07, 73/460, 461, 468; 464/127, 180

See application file for complete search history.

(56) References Cited

U.S. PATENT DOCUMENTS

| 1,958,982 | A |   | 5/1934 | Wintercorn |
| 1,967,487 | A |   | 7/1934 | Waisner |
| 2,024,671 | A |   | 12/1935 | Waisner |
| 4,895,551 | A | * | 1/1990 | Fritz ......................... 464/180 |
| 5,857,916 | A |   | 1/1999 | Schoch et al. |
| 6,655,208 | B1 | * | 12/2003 | McClanahan ................ 73/462 |

* cited by examiner

*Primary Examiner*—Eric Compton
(74) *Attorney, Agent, or Firm*—MacMillan, Sobanski & Todd, LLC

(57) ABSTRACT

A method of manufacturing a tube for a vehicle driveshaft assembly forms a flat sheet of material having a greater thickness than other portions over a portion of its width and along its length, rolling the sheet about a longitudinal axis such that its lateral edges are mutually adjacent, then securing the lateral edges together by seam welding to form a tube. The mass distribution is not uniform because the wall thickness of certain portions of the tube is greater than the wall thickness of other portions of the tube. A tube yoke is machined and the angular location of its overbalance about its longitudinal axis is determined. The tube is secured to the tube yoke such that the angular location of overbalance of the yoke is aligned with the weld seam and diametrically opposite the region of the tube having the greater wall thickness.

12 Claims, 4 Drawing Sheets

USE OF DRIVESHAFT WALL THICKNESS VARIATION TO BALANCE A DRIVESHAFT ASSEMBLY

BACKGROUND OF THE INVENTION

The invention relates to motor vehicle driveshaft assemblies. More particularly, the invention applies to use of the mass distribution of a driveshaft tube to minimize the initial imbalance of a driveshaft assembly.

A drive train system transmits rotational power from the output of an engine/transmission assembly to the input of an axle assembly, through which the wheels of the vehicle are driven. To accomplish this, a typical vehicular drive train system includes a driveshaft assembly having first and second end fittings, tube yokes secured by welding to the opposite ends of a tubular shaft. The first yoke forms a portion of a first universal joint, which provides a rotatable driving connection between the output shaft of the engine/transmission assembly and a first end of the driveshaft assembly. Similarly, a second yoke forms a portion of a second universal joint, which provides a rotatable driving connection between the second end of the driveshaft assembly and the input shaft of the axle assembly. The universal joints accommodate a limited amount of angular misalignment between the axes of the driveshaft portions.

In some vehicles, the distance separating the engine/transmission assembly and the axle assembly is relatively short. For these vehicles, the driveshaft assembly is formed from a single, relatively long driveshaft tube having first and second yokes secured to the respective ends of the tube. In other vehicles, however, the distance separating the engine/transmission assembly and the axle assembly is relatively long, making it impractical to use a single driveshaft tube. For these vehicles, the driveshaft assembly is formed from separate, relatively short driveshaft sections. In a compound driveshaft assembly, a first end of the first driveshaft section is connected to the output shaft of the engine/transmission assembly by a first universal joint. A second end of the first driveshaft section is connected to a first end of the second driveshaft section by a second universal joint, and a second end of the second driveshaft section is connected to the input shaft of the axle assembly by a third universal joint.

The engine/transmission assembly induces a variety of relatively high frequency, lateral and torsional vibrations in the driveshaft assembly as it rotates in service. To avoid excessive vibration and noise in a driveshaft, the assembly is balanced, statically and/or dynamically, to determine the locations on the assembly where weights can be placed to avoid resonance, to attenuate noise, and to minimize flexural displacement.

Balance weights are conventionally attached to the external surface of a driveshaft tube by welding or with adhesives. However, heat produced by the welding process can structurally affect the driveshaft tube. Alternatively, balance weights are attached to the interior surfaces of the driveshaft tube so the weight is retained in position against the tendency of centrifugal force and flexural displacement of the driveshaft to dislodge the weight. It is preferable to attach a balance weight to the interior of a driveshaft after the unit is assembled, rotated, and its balance tested to determine the location where balance weight could be placed to improve performance, especially its response to vibratory excitation. However, access to the interior of an assembled driveshaft is limited. Securing a balance weight internally at an optimal angular position about the longitudinal axis of the assembly is difficult without disassembling the driveshaft. Disassembly, installation of the weight, and reassembly is time consuming and adds cost.

SUMMARY OF THE INVENTION

With either balance weight retention technique, it is preferably that the size and weight of the balance weight be minimized. In order to minimize the weight used to balance the assembly, care is taken in the production of each assembly component to assure that its center of balance is located as close to the longitudinal axis as possible. However, certain driveshaft components, although symmetric with respect to a lateral axis, lack polar symmetry. For example, the tube yoke is symmetric about a lateral axis, but it is asymmetric about the longitudinal axis. Furthermore its surfaces are formed by extensive machining. These factors produce component imbalance and cause the need for weight to be added to balance the assembly.

However, it has been discovered that variations in the tube wall thickness can be controlled during the process of rolling flat sheet stock from which the tube is formed. A portion of the lateral width of the sheet, corresponding to a portion of the circumferential length of the tube, is formed with a thicker, heavier wall than the wall thickness in other portions of the sheet's width, i.e., the tube's circumferential length. The increased mass distribution in this area is used to offset the imbalance of other components and to minimize weight required to balance the driveshaft assembly.

This invention relates to a method of producing a vehicle driveshaft assembly by forming a flat sheet of material having a greater thickness at a portion of its width and along its length than the thickness of other portions of the sheet, rolling the sheet about a longitudinal axis such that its lateral edges are mutually adjacent, then securing the lateral edges together by seam welding to form a tube. The mass distribution of the tube is not uniform about the axis because the wall thickness of certain portions of the tube is greater than the wall thickness of other portions of the tube. A tube yoke is machined and then balanced to determine the angular location of its overbalance about the longitudinal axis. The tube is secured to the tube yoke such that the angular location of the yoke's overbalance is diametrically opposite the portion of the tube having the heavier wall thickness.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
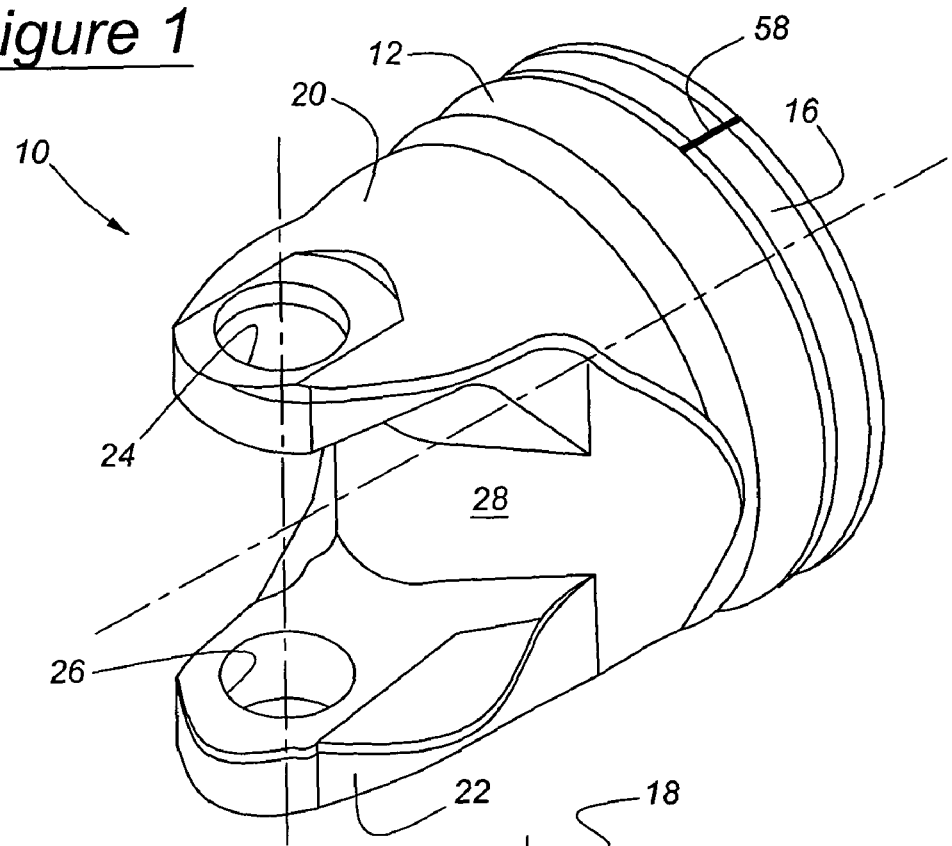
FIG. 1 is an isometric view of a tube yoke for use in a vehicle drive shaft assembly.
Figure 2:
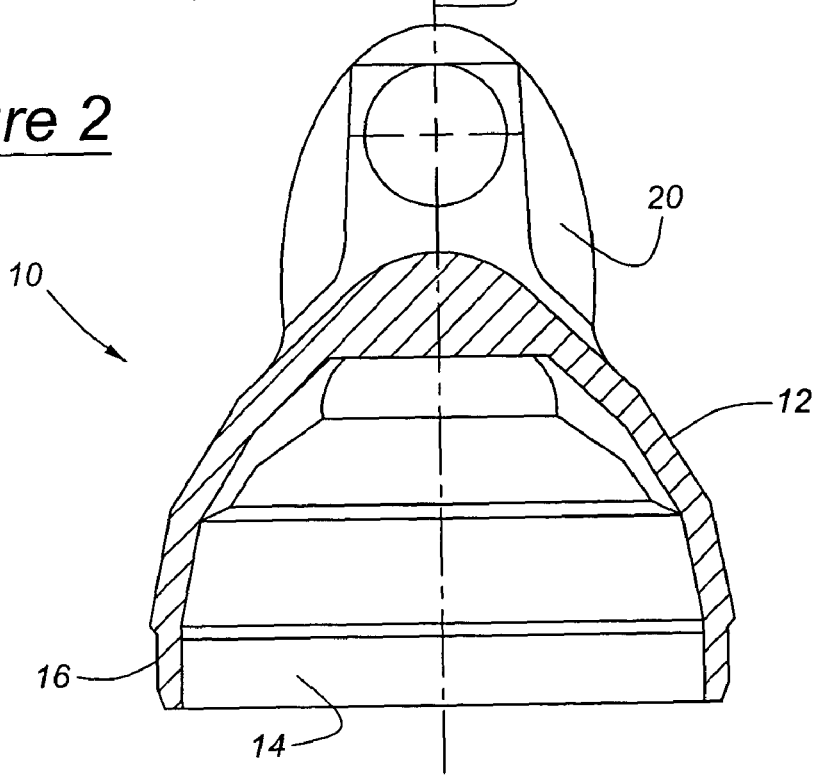
FIG. 2 is a cross section of the tube yoke of FIG. 1 taken at a longitudinal plane parallel to the lugs.

Referring now to the drawings, there is illustrated in FIGS. 1 and 2 a tube yoke 10 for a drive shaft. The yoke includes a bell housing 12 having an outer ring 14, whose outer surface is formed with a recessed land 16, adapted for connection to an end portion of the length of a cylindrical tube that overlaps the land 16. The tube extends axially about the central, longitudinal axis 18 approximately 70 inches from the end of the tube yoke 10. The housing 12 is formed with upper and lower axially extending lugs or flanges 20, 22, respectively. Each lug is formed with a laterally directed hole 24, 26 extending through its thickness and aligned with the hole of the other lug. The axial end of the yoke closest to the lugs is closed by a bulkhead 28, machined with a contour that blends into the upper and lower lugs 20, 22. The yoke is machined preferably from 6061 aluminum and, as finished, the material is in the T6 condition.

Figure 3:
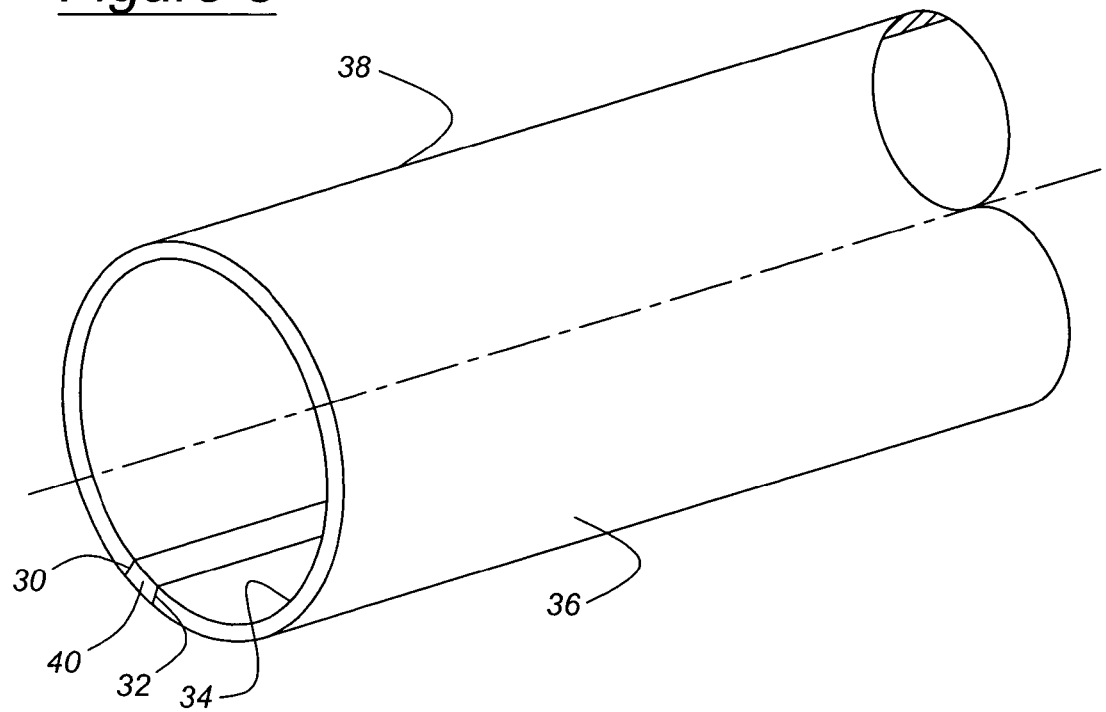
FIG. 3 is an isometric view of a seam welded drive shaft tube.

FIG. 3 is an isometric view of a drive shaft tube, formed preferably of metallic sheet, for assembly to the yoke 10. The sheet material is rolled about the longitudinal axis such that the lateral edges 30, 32 of the sheet are disposed mutually adjacent, and the outer and inner surfaces 34, 36 of the sheet form a circular cylindrical tube 38.

The lateral edges are joined by a straight, axially directed weld seam 40 extending along the full length of the sheet. The weld is formed preferably using only the material of the sheet, without additional material. The tube is sized such that its inner surface 34 overlaps the recessed land 16 located at the axial end of tube yoke 10.

The weight per unit length along the circumference of tube 38 (called the "mass distribution") is not uniform. Instead, the mass distribution has localized, heavy circumferentially extending portions separated by lighter circumferentially extending portions. This variation in mass distribution is partially due to variations in wall thickness, i.e., to variations in thickness across the width of the sheet from which the tube is formed.

Figure 4:
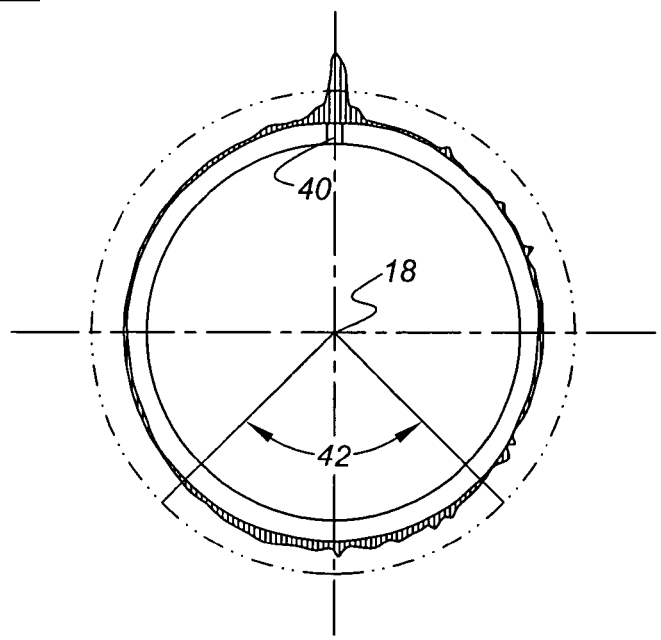
FIG. 4 is a cross section showing the variation of mass along the circumferential length of a seam-welded tube for use in a drive shaft assembly.

FIG. 4 shows the mass distribution of tube 38 along the circumference of the tube. The weight per unit length at the location of the weld seam 40 and in the immediate vicinity of the weld seam 40 in both angular directions is greater than at any other location on the circumference. However, the relatively large mass distribution at the weld seam 40 extends over a short circumferentially extending portion of the circumference. In the region 42 along another circumferentially extending portion of the circumference, diametrically opposite the location of the weld seam 40, the weight per unit length is larger than at other circumferentially extending portions of the circumference located between the weld seam 40 and the region 42. Although the weight per unit length of the region 42 is less than the peak magnitude near the weld seam 40, the length of the circumferentially extending portion 42 is much greater than the length of the concentrated mass distribution in the vicinity of the weld seam 40. The center of balance of the tube 38 is located on or near the diameter that passes through the weld seam 40, and it is located closer to region 42 than to the weld seam 40. Therefore, the heavy side of the tube 38 is opposite the weld seam 40. This information is used to assist in balancing the driveshaft assembly.

Variations in the wall thickness in the region 42, diametrically opposite the seam weld 40, are typically up to five times greater than the variation in the wall thickness between the weld 40 and region 42 in either direction from the weld seam. This wall thickness variation is typically a small percentage of the total wall thickness.

Figure 5:
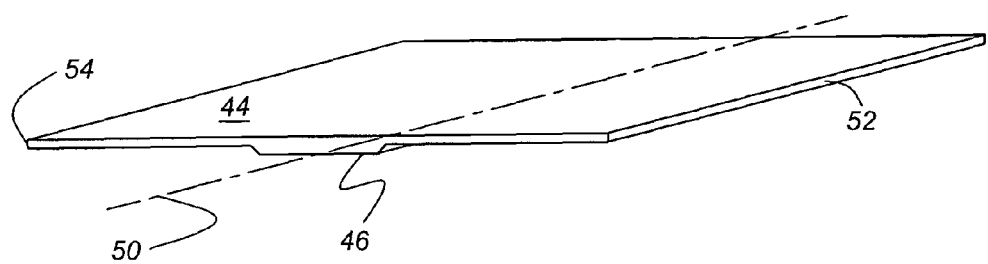
FIG. 5 is an isometric view of a sheet having a symmetrically located increased thickness region.
Figure 6:
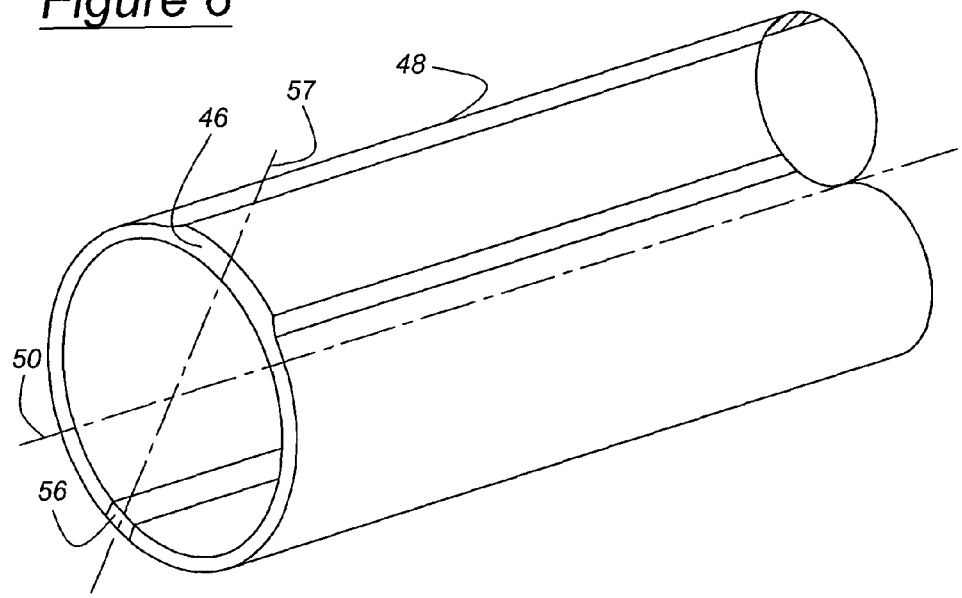
FIG. 6 is an isometric view of a tube formed from the sheet of FIG. 5.
Figure 7:
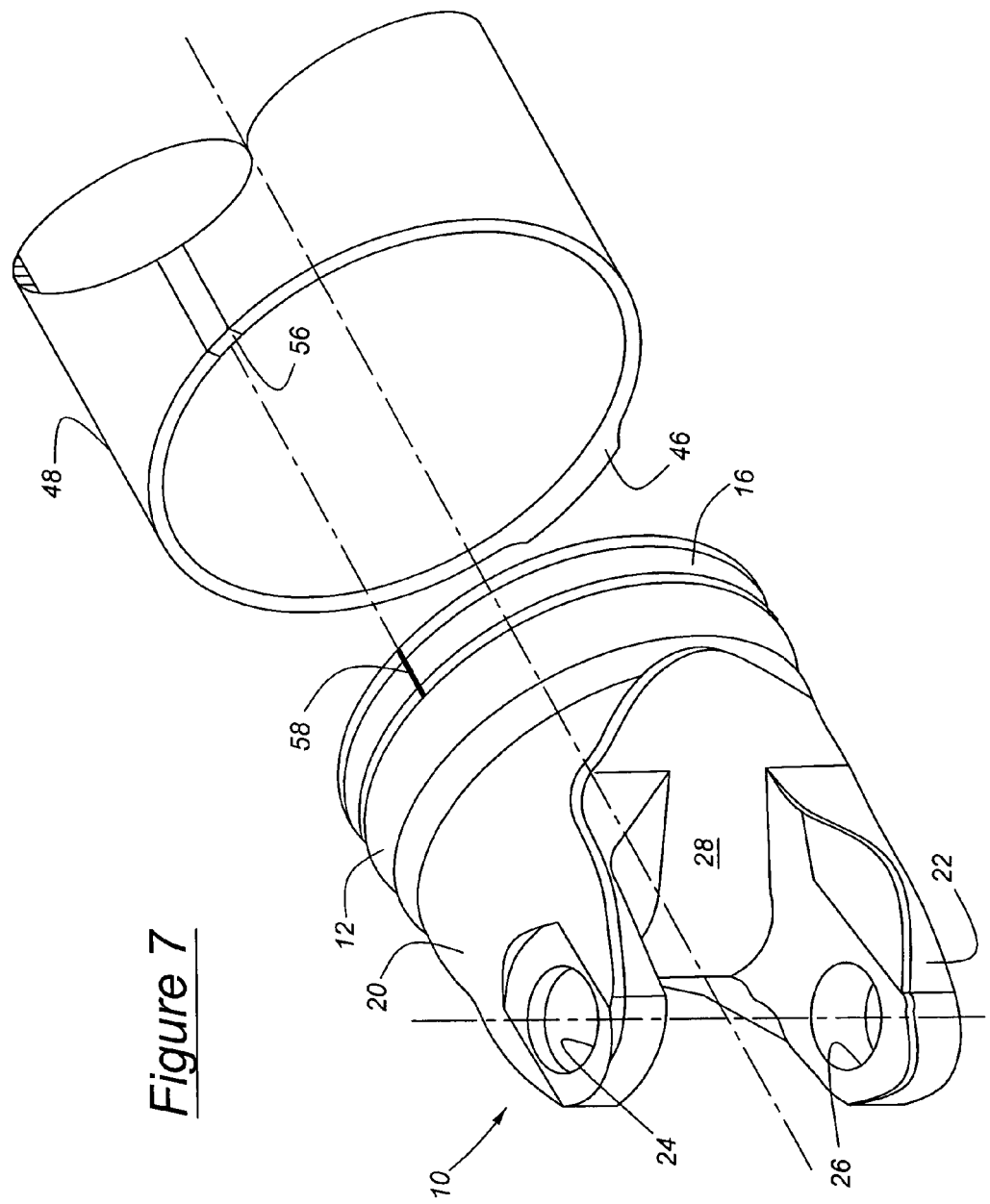
FIG. 7 is an isometric view of a tube and tube yoke being assembled according to this invention.

FIG. 5 shows a sheet of metal 44 having a region 46 of increased thickness compared to the thickness elsewhere. Region 44 is centrally located laterally and extends across a portion of the width and along the entire length of the sheet. The sheet may be of aluminum or another metal and is about 18 inches wide and 70 inches long. The tube 48 of FIG. 6 is constructed by rolling sheet 44 about the longitudinal axis 50 such that the lateral edges 52, 54 are mutually adjacent. Then the lateral edges are joined together by a butt seam weld 56 to form a cylindrical tube. The geometric center 57 of the width of the thicker wall region 46 is approximately midway between the lateral edges 52, 54. The tube 48 formed from sheet 44, therefore, has the center 57 of the circumferential length of the increased wall thickness portion 46 located diametrically opposite the seam weld 56. The mass distribution of the thicker wall region 46 offsets or counterbalances the large mass distribution in the vicinity of the seam weld 56. The weight per unit centrifugal length of the tube is substantially symmetrically distributed about a lateral axis of tube 48.

The process for assembling the drive shaft includes the step of machining the tube yoke 10. Then a fully machined tube yoke is checked for balance to determine the location of the imbalance about the longitudinal axis. The angular location about axis 18 where the yoke is out of balance due to its being net overweight at that location (called the "location of overbalance") is recorded. The magnitude and location of overbalance are marked preferably on the surface of the yoke at the angular location 58 of the overbalance, or that information is otherwise recorded with reference to the serial number of the yoke.

A tube is fitted over the surface of land 16 such that the angular location of overbalance of the yoke, represented by the mark at 58, is aligned angularly with the weld seam 40. This will locate region 42 opposite the location of the tube yoke overbalance. The tube is then secured to the yoke by welding. In this way, the mass distribution properties of the driveshaft tube 48 itself are used to counterbalance or offset the overbalance of the tube yoke. Any balance weight later added to statically or dynamically balance the driveshaft assembly is less than the balance weight that would have been required to balance the assembly without the initial balance method of this invention.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for forming a driveshaft assembly, comprising the steps of:
    forming a yoke having a longitudinal axis;
    determining a location of overbalance of the yoke about the axis;
    forming a tube having a first wall thickness extending along a first circumferential portion of the tube, the tube including a region extending along a second circumferential portion of the tube and having a second wall thickness greater than the first wall thickness, the region of the tube defining a mass distribution; and
    fitting the tube on the yoke such that the region is spaced angularly about the axis from the location of overbalance such that the mass distribution of the region of the tube offsets the overbalance of the yoke.

2. The method of claim 1, wherein the tube has a circular cross section and the region has a center located substantially at a midpoint along the second circumferential portion, the method further comprising the step of fitting the tube on the yoke such that a center of the region is located diametrically opposite the location of overbalance.

3. The method of claim 1, wherein the tube has a circular cross section and includes a weld seam extending longitudinally along the tube substantially parallel to the axis, the method further comprising the step of fitting the tube on the yoke such that the location of overbalance is aligned with the weld seam.

4. The method of claim 1, further comprising the step of securing the tube to the yoke.

5. The method of claim 1, wherein the step of forming the tube further comprises:
    forming a sheet having a width bounded by lateral edges, the first wall thickness being located in first portions of the width, and the second wall thickness being located in a second portion of the width;
    rolling the sheet about a longitudinal axis such that the lateral edges are mutually adjacent; and
    securing the lateral edges together by welding.

6. The method of claim 1, wherein the step of forming a tube further comprises:
    forming a sheet having a width bounded by lateral edges, the first wall thickness being located in first portions of the width, and the second wall thickness being located in a second portion of the width centrally located between the lateral edges;
    rolling the sheet about a longitudinal axis such that the lateral edges are mutually adjacent; and
    securing the lateral edges together by welding.

7. The method of claim 1, wherein the step of forming a tube further comprises:
    forming a sheet having a width bounded by lateral edges, the first wall thickness being located in first portions of the width, and the second wall thickness being located in a second portion of the width aligned with a geometric center of the second portion between the lateral edges;
    rolling the sheet about a longitudinal axis such that the lateral edges are mutually adjacent; and
    securing the lateral edges together by welding.

8. A method of manufacturing a tube for use it a vehicle driveshaft assembly including the steps of:
    forming a sheet having a width bounded by lateral edges, a first thickness extending across first portions of the width, and a region having second thickness greater than the first wall thickness extending across a second portion of the width;
    rolling the sheet about a longitudinal axis such that the lateral edges are mutually adjacent; and
    securing the lateral edges together by welding wherein a mass distribution defined by the region offsets a mass distribution defined by the welded lateral edges.

9. The method of claim 8, wherein the step of forming a sheet further comprises the step of locating the region centrally between the lateral edges.

10. The method of claim 8 wherein the step of securing the lateral edges together further comprises welding the lateral edges together along a longitudinal seam.

11. The method of claim 10, wherein the step of forming a sheet further comprises the step of aligning the region diametrically opposite the weld seam.

12. A method of manufacturing a tube comprising the steps of:
    providing a sheet of material having first and second edges, the sheet of material having first wall thickness portions that extend from the first and second longitudinally extending edges and a second wall thickness portion that extends between the first wall thickness portions;
    rolling the sheet of material such that the first and second edges are located adjacent to one another; and
    securing the first and second edges together to form a tube having a first mass distribution defined by the second wall thickness portion that offsets a second mass distribution defined by the first wall thickness portions.

* * * * *